July 25, 1950     C. A. BALDWIN     2,516,172
HYDRAULIC SEAT

Original Filed April 5, 1945

Inventor
Charles A. Baldwin
By L. B. James
Attorney

Patented July 25, 1950

2,516,172

UNITED STATES PATENT OFFICE 2,516,172

HYDRAULIC SEAT

Charles A. Baldwin, Olney, Ill.

Substituted for abandoned application Serial No. 586,771, April 5, 1945. This application March 14, 1949, Serial No. 81,261

2 Claims. (Cl. 267—1)

This invention relates to seats and chairs and more particularly pivoted seats.

The primary object of this invention resides in the provision of a seat adapted to yield under the weight of an individual seated thereon.

Another object of this invention resides in the provision of a pivoted seat adapted to gradually assume a comfortable position under the weight of an individual seated thereon.

A further object of this invention resides in the provision of a pivoted seat adapted to gradually return to normal position when the occupant thereof rises therefrom.

A still further object of this invention resides in the particular construction of the cushioning element.

In addition to the aforesaid objects of this invention is the particular manner of controlling the operation of the piston of the cushioning cylinder.

With these and other objects in view, this invention resides in certain novel features of construction and arrangement of elements to be hereinafter set forth in the specification, illustrated in the accompanying drawing and pointed out in the appended claims, and, while this disclosure depicts my present conception of the invention, the right is reserved to resort to such changes in construction and arrangement of elements as come within the scope of the claims.

In the accompanying drawing forming a part of this application;

Figure 1:
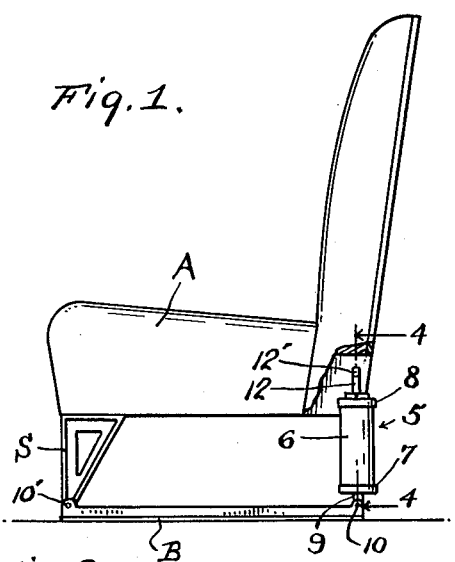
Fig. 1 is a side view of a pivoted seat constructed in accordance with this invention.
Figure 2:
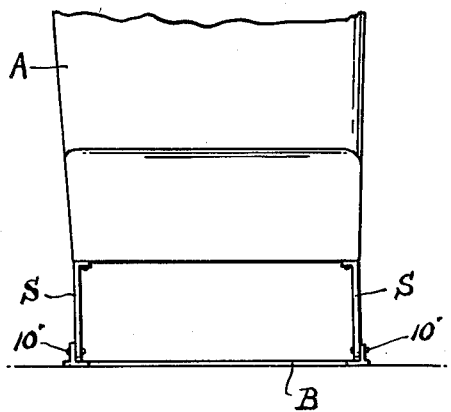
Fig. 2 is a front view thereof.
Figure 3:
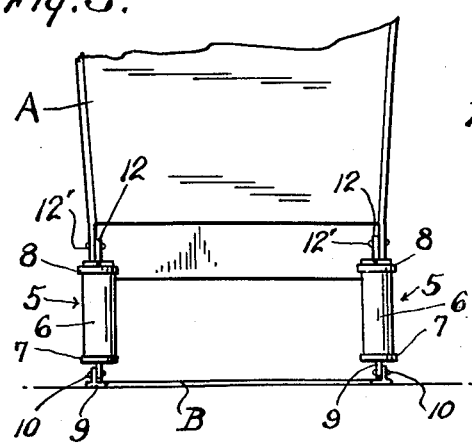
Fig. 3 is a rear view thereof.
Figure 4:
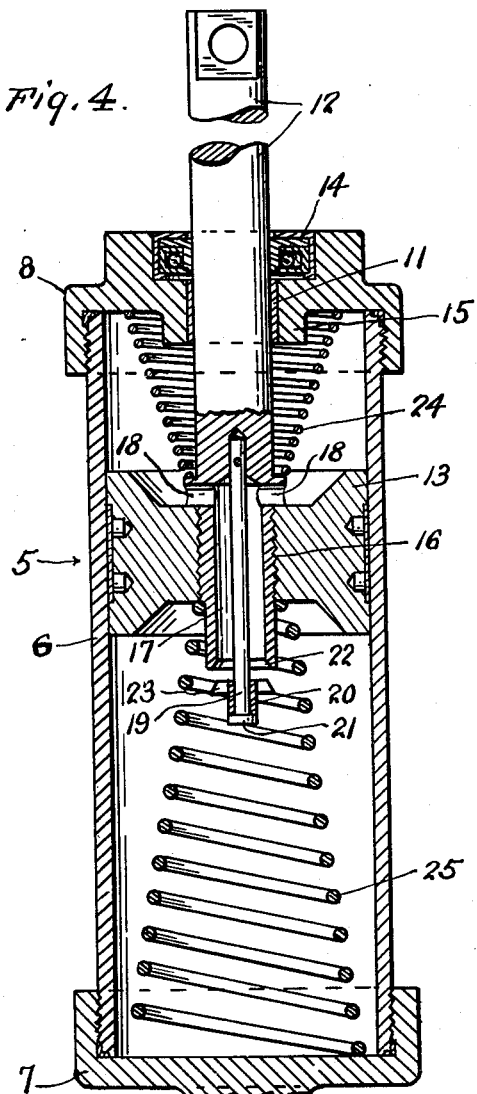
Fig. 4 is an enlarged vertical sectional view taken approximately on line 4—4 of Fig. 1.
Figure 5:
Fig. 5 is a perspective view of the valve.

In the present illustration of this invention, the letter A designates a seat of any suitable construction herein shown as pivotally mounted at its front end on a suitable base B by standards S and retained in normal unoccupied position at its rear end, by cushioning elements 5, forming the subject matter of this invention.

Each cushioning element 5 consists of a cylinder 6 having caps 7 and 8 secured on its opposite ends, the former of which is provided with an apertured lug 9 adapted to receive a pin 10 to pivotally connect the cylinder to the base B or other suitable support, while the latter of which is provided with a bore 11 through which slidably extends the rod 12 of a piston 13 disposed within the cylinder. The cap 8 is provided with a suitable packing gland 14 in its outer portion and an annular boss 15 on its inner surface.

The rod is connected to the seat at its outer end by a pivot 12' and threadedly connected to the piston 13 as indicated by the numeral 16 and is provided, in its lower portion, with a passage 17 and apertures 18 forming communication between those areas on opposite sides of the piston.

Secured to the lower portion of said rod 12 and extending inwardly and axially of the passage 17 is an enlarged guide pin 19 on which is slidably mounted a conical valve 20 adapted to rest against a stop element 21 on the pin 19 when in open position and against a valve-seat 22 in the end of the rod 12 when in active or operating position during a period when the seat is being occupied and, in order to control passage of fluid from the lower area of the cylinder to the upper area thereof while the seat is being occupied and to afford comfort to the occupant thereof, the valve is provided with a series of bleed passages 23.

Disposed within the cylinder on opposite sides of the piston are conical coil springs 24 and 25, the latter of which is preferably of greater resistance than the former in order to balance action of the piston within the cylinder and assist in supporting the weight of the occupant of the seat, while the former acts to limit upward movement of the piston and also retain it in a normal inactive position when the seat is unoccupied.

With this invention fully described, it is manifest that means are provided whereby rigidity of the seat is eliminated at all times and, through the instrumentality of the bleed-valve, a comfortable reclining position on the seat will be gradually obtained by the occupant thereof.

This application is a substitute for abandoned application Serial No. 586,771, filed April 5, 1945.

Having thus described my invention, what I claim and desire to protect by Letters Patent is:

1. A cushioning element for pivoted seats comprising, a cylinder including a pivot cap at one end, an apertured cap secured to the other end of the cylinder, a piston slidably disposed within the cylinder and having a centrally disposed threaded bore therethrough, a piston rod threadedly engaging the threaded bore in the piston and having an axial bore in its lower portion communicating with apertures in the rod to provide communication on opposite sides of the piston, a guide pin secured to the rod and extending axially through and beyond the bore in the rod, a valve seat in the lower end of the rod, a valve having bleed-passages slidably disposed on the guide pin in opposed disposition to the valve-seat, a stop element on the lower end of the guide pin supporting the valve when in inactive position, conical coil springs within the cylinder with their smaller ends surrounding the piston rod and bearing against opposite sides of the piston, one of said springs being of greater strength than the other, and a packing gland in said cap and surrounding the piston rod.

2. A cushioning element for pivoted seats comprising, a cylinder exteriorly threaded at its opposite ends, a pivot cap threadedly secured to one of the threaded ends of the cylinder, a centrally apertured cap threadedly secured to the opposite end of the cylinder, an inwardly extending boss formed on the inner surface of the last mentioned cap and having an aperture therethrough registered with the aperture in the cap, a piston having its opposite ends reduced in thickness inwardly of its periphery and formed with a centrally threaded bore therethrough, a piston rod slidably disposed in the aperture of the last mentioned cap and boss thereon with its inner portion threadedly engaging the threads in the piston and having a bore extending therethrough from its inner end and above the upper surface of the reduced portion of the piston and communicating with ports therein disposed above the reduced portion of the piston, a guide pin secured to the base of the bore in the piston rod and extending beyond its open end, a valve-seat surrounding the open end of the piston rod, a valve having bleed-passages slidably disposed on the guide pin in opposed disposition to the valve-seat, a stop element on the lower end of the guide pin supporting the valve in spaced relation to the valve-seat when in inactive position, a coil spring within the cylinder and having one end bearing against the apertured cap and its opposite end bearing against a shoulder on one side of the piston rod, a second coil spring of greater strength than the first mentioned coil spring disposed within the cylinder and having one end thereof bearing against the pivot cap and its opposite end surrounding the inner end of the piston rod and bearing against the opposite end of the piston, and a packing gland disposed in the apertured cap and surrounding the piston rod.

CHARLES A. BALDWIN.

No references cited.